United States Patent
Lee

(10) Patent No.: US 9,997,809 B2
(45) Date of Patent: Jun. 12, 2018

(54) BATTERY MODULE

(71) Applicant: SAMSUNG SDI CO., LTD., Yongin-si, Gyeonggi-do (KR)

(72) Inventor: Ha-Neul Lee, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 155 days.

(21) Appl. No.: 14/975,892

(22) Filed: Dec. 21, 2015

(65) Prior Publication Data

US 2017/0069897 A1 Mar. 9, 2017

(30) Foreign Application Priority Data

Sep. 3, 2015 (KR) .................. 10-2015-0124880

(51) Int. Cl.
| | |
|---|---|
| *H01M 2/20* | (2006.01) |
| *H01M 10/42* | (2006.01) |
| *H01M 2/10* | (2006.01) |
| *H01M 2/22* | (2006.01) |
| *H01M 2/24* | (2006.01) |

(52) U.S. Cl.
CPC ....... *H01M 10/425* (2013.01); *H01M 2/1016* (2013.01); *H01M 2/202* (2013.01); *H01M 2/10* (2013.01); *H01M 2/105* (2013.01); *H01M 2/22* (2013.01); *H01M 2/24* (2013.01); *H01M 2220/20* (2013.01); *H01M 2220/30* (2013.01)

(58) Field of Classification Search
CPC ........ H01M 6/42; H01M 2/202; H01M 2/204; H01M 2/206; H01M 2/022; H01M 2/10; H01M 2/1005; H01M 2/1011; H01M 2/105; H01M 2/208; H01M 2/24
See application file for complete search history.

(56) References Cited

U.S. PATENT DOCUMENTS

| | | | |
|---|---|---|---|
| 6,428,364 B2* | 8/2002 | Saito | H01M 2/206 439/719 |
| 2009/0104513 A1 | 4/2009 | Um | |
| 2011/0305942 A1 | 12/2011 | Park | |
| 2013/0095372 A1* | 4/2013 | Kim | H01M 2/18 429/178 |

FOREIGN PATENT DOCUMENTS

| | | |
|---|---|---|
| JP | 2008251352 | * 10/2008 |
| KR | 10-2009-0022892 A | 3/2009 |
| KR | 10-2011-0135184 A | 12/2011 |
| KR | 10-2014-0135399 A | 11/2014 |

* cited by examiner

*Primary Examiner* — Ula C Ruddock
*Assistant Examiner* — Matthew W Van Oudenaren
(74) *Attorney, Agent, or Firm* — Lee & Morse P.C.

(57) ABSTRACT

A battery module, including a plurality of rechargeable batteries; a holder fixing the rechargeable batteries; an electrode tab connecting the rechargeable batteries, the electrode tab including a bent portion bent and then extending in a side direction of the rechargeable batteries; and a balancing wire connecting the electrode tab and the protection circuit board, the bent portion of the electrode tab including a protruding portion protruding from a surface of the electrode tab.

7 Claims, 12 Drawing Sheets

BATTERY MODULE

CROSS-REFERENCE TO RELATED APPLICATION

Korean Patent Application No. 10-2015-0124880, filed on Sep. 3, 2015, in the Korean Intellectual Property Office, and entitled: "Battery Module," is incorporated by reference herein in its entirety.

BACKGROUND

1. Field

Embodiments relate to a battery module.

2. Description of the Related Art

Unlike a primary battery, a rechargeable battery may be iteratively charged and discharged. Low-capacity rechargeable batteries may be used for portable compact electronic apparatuses such as mobile phones, notebook computers, and camcorders, and high-capacity rechargeable batteries may be used as a power source for driving a motor of, for example, a hybrid vehicle.

SUMMARY

Embodiments may be realized by providing a battery module, including a plurality of rechargeable batteries; a holder fixing the rechargeable batteries; an electrode tab connecting the rechargeable batteries, the electrode tab including a bent portion bent and then extending in a side direction of the rechargeable batteries; and a balancing wire connecting the electrode tab and a protection circuit board, the bent portion of the electrode tab including a protruding portion protruding from a surface of the electrode tab.

The electrode tab may include a first tab connecting the rechargeable batteries; and a second tab connected to the first tab, the second tab being bent and then extending in the side direction of the rechargeable batteries.

The protruding portion may protrude from a surface of the electrode tab in a region where the first tab and the second tab are connected.

One side of the protruding portion may be connected to the first tab and another side of the protruding portion may be connected to the second tab, and the protruding portion may be bent multiple times.

The protruding portion may have a thickness that is smaller than a thickness of the first tab or a thickness of the second tab.

The protruding portion may include a plurality of protrusion and depression portions in a connection portion between the first tab and the second tab.

The protruding portion may include a wrinkled portion.

The protruding portion may connect the first tab and the second tab with a rounded shape.

The second tab may be connected to the balancing wire by a connector.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
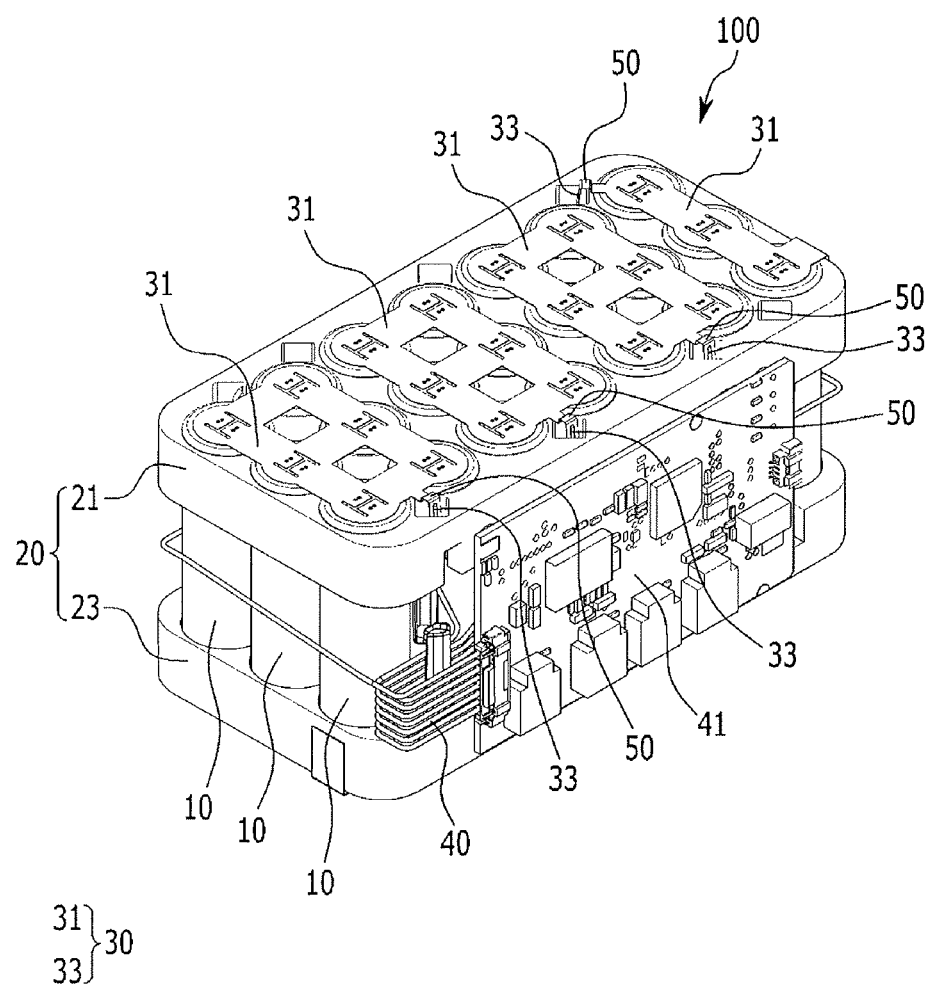
FIG. 1 illustrates a schematic perspective view of a battery module according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Like reference numerals refer to like elements throughout.

Figure 2:
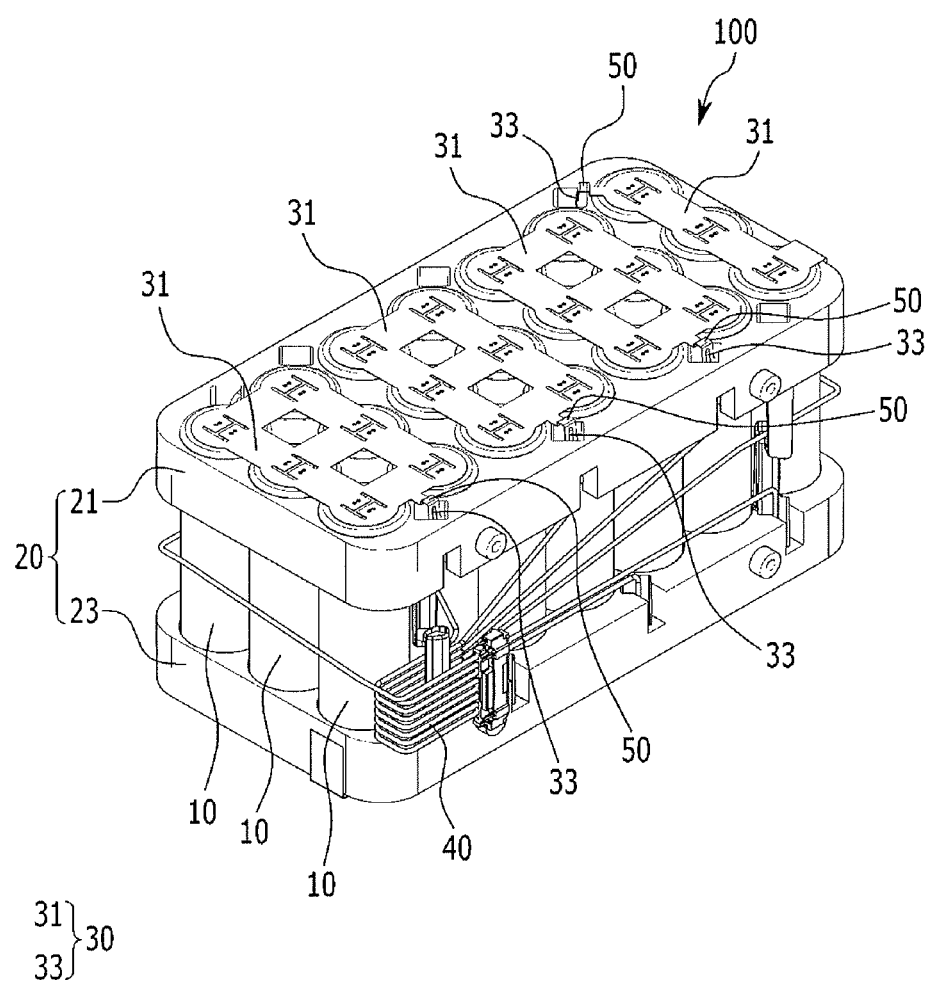
FIG. 2 illustrates a schematic perspective view of the battery module of FIG. 1 in another view.
Figure 3:
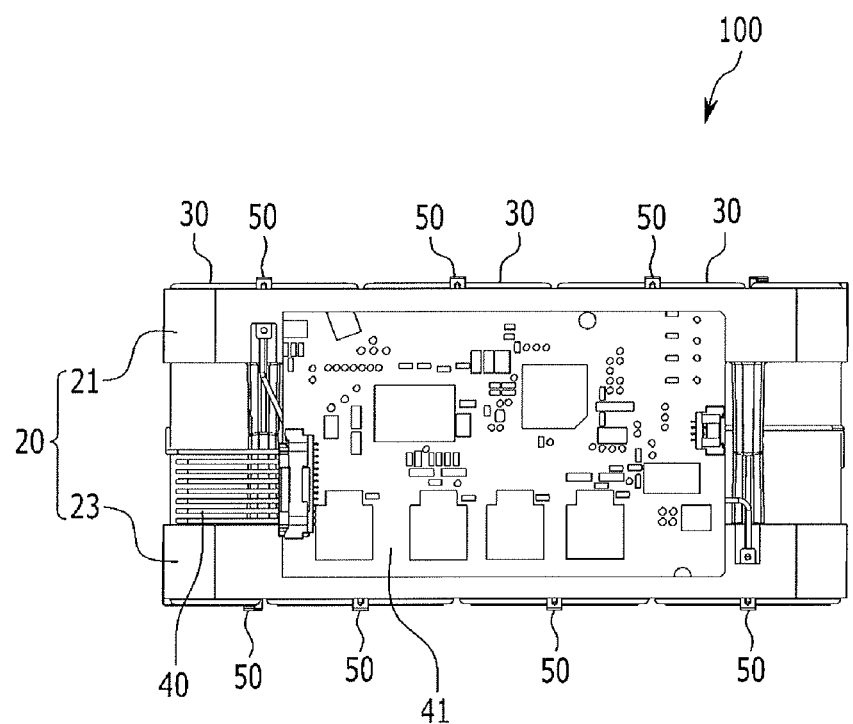
FIG. 3 illustrates a schematic side view of a connection state of a balancing wire and a protection circuit board of FIG. 1.
Figure 4:
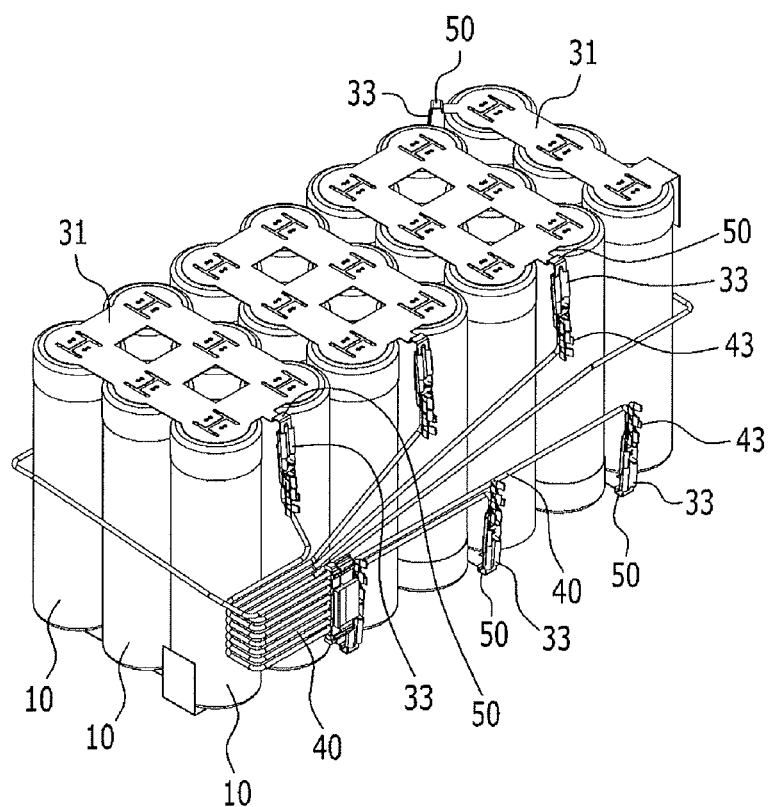
FIG. 4 illustrates a schematic perspective view of a connection state in which a holder is eliminated in the battery module of FIG. 1, and the electrode tab and the balancing wire are connected by a connector.
Figure 5:
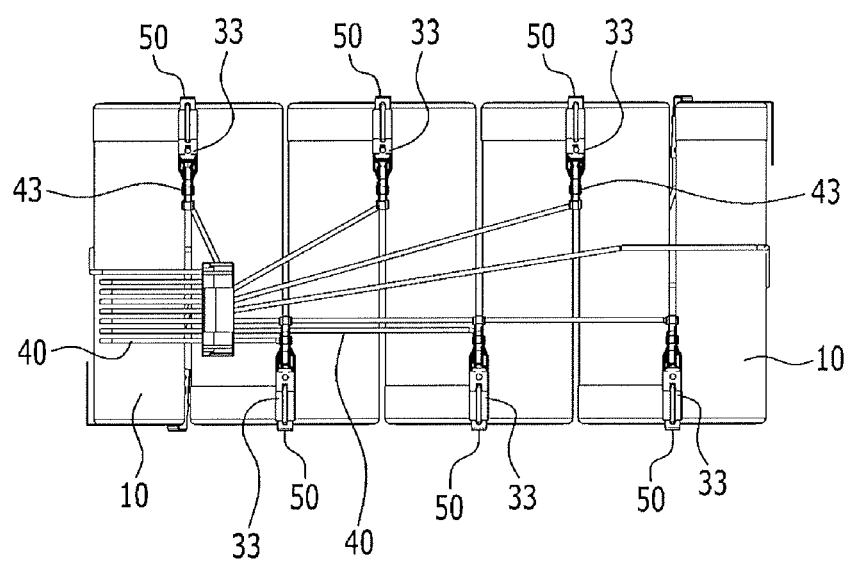
FIG. 5 illustrates a schematic side view of a state in which the electrode tab and the balancing wire of FIG. 4 are connected by a connector.

FIG. 1 illustrates a schematic perspective view of a battery module according to an exemplary embodiment, FIG. 2 illustrates a schematic perspective view of the battery module of FIG. 1 in a different view, FIG. 3 illustrates a schematic side view of a connection state of a balancing wire and a protection circuit board of FIG. 1, FIG. 4 illustrates a schematic perspective view of a connection state in which a holder is eliminated in the battery module of FIG. 1, and the electrode tab and the balancing wire are connected by a connector, and FIG. 5 illustrates a schematic side view of a state in which the electrode tab and the balancing wire of FIG. 4 are connected by a connector.

As shown in FIG. 1 to FIG. 5, a battery module 100 according to an exemplary embodiment may include a plurality of rechargeable batteries 10, a holder 20 fixing the rechargeable batteries 10, an electrode tab 30 bent and extended along a side surface direction of the rechargeable battery 10 while connecting the rechargeable batteries 10, and a balancing wire 40 connecting the electrode tab 30 and a protection circuit board 41. As used herein, the term "bent" is not limited to a configuration formed by bending.

The rechargeable battery 10 may refer to a cylindrical battery. A plurality of rechargeable batteries 10 may be disposed adjacent to each other and connected by the electrode tab 30. In the present exemplary embodiment, the rechargeable batteries 10 are arranged in a plurality of columns and a plurality of rows and then fixed to the holder 20.

The rechargeable batteries 10 may be arranged in a manner such that neighboring rechargeable batteries 10 have different polarities. Rechargeable batteries 10 that neighbor other rechargeable batteries of which positive polarities are disposed in one direction may be arranged so as to dispose negative polarities thereof in the one direction.

The holder 20 may include a first holder 21 fixing the rechargeable batteries 10 in one side and a second holder 23 fixing the rechargeable batteries 10 in the other side at a location that is opposite to that of the first holder 21.

The first holder 21 may fix the rechargeable batteries 10 arranged in a plurality of columns and a plurality of rows at one side, and one side portions of the rechargeable batteries 10 may be fixed to the holder 21. First insertion grooves may be formed such that the one side portions of the rechargeable batteries 10 may be inserted therein.

The second holder 23 may fix the other sides of the rechargeable batteries 10 at the other sides in the opposite location of the first holder 21, interposing the rechargeable batteries 10 therebetween, and the other side portions of the rechargeable batteries 10 may be inserted therein. Second insertion grooves may be formed in the second holder 23 for insertion of the other sides of the rechargeable batteries 10.

The first holder 21 and the second holder 23 may have the same or similar structure to stably fix the rechargeable batteries 10 at lateral sides thereof.

The electrode tab 30 may be connected to the rechargeable batteries 10.

The electrode tab 30 may connect the rechargeable batteries 10, and a part of the electrode tab 30 may be bent and extend in a side direction of the rechargeable batteries 10.

Figure 6:
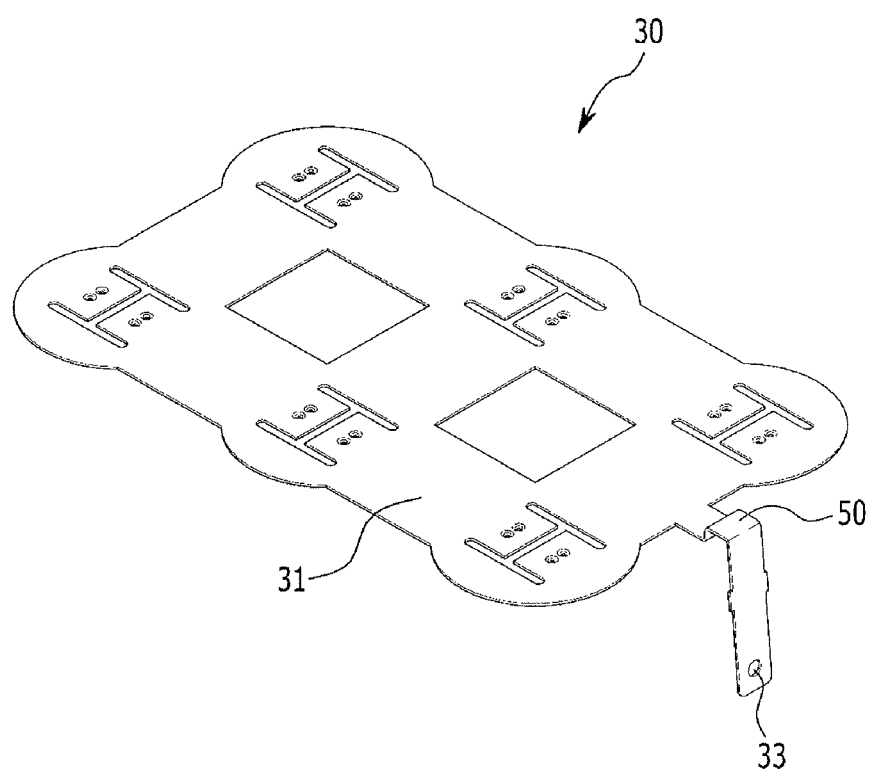
FIG. 6 illustrates a schematic perspective view of an electrode tab connecting rechargeable batteries.
Figure 7:
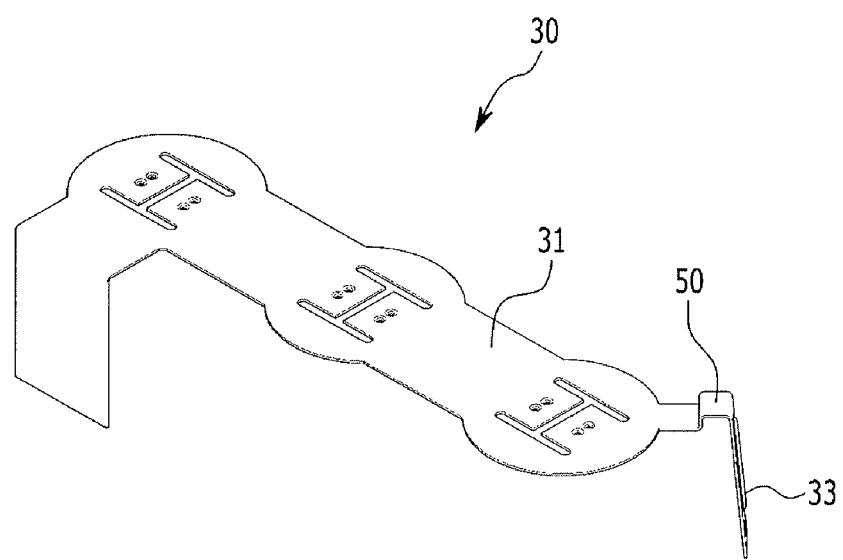
FIG. 7 illustrates a schematic perspective view of an electrode tab connecting three rechargeable batteries.
Figure 8:
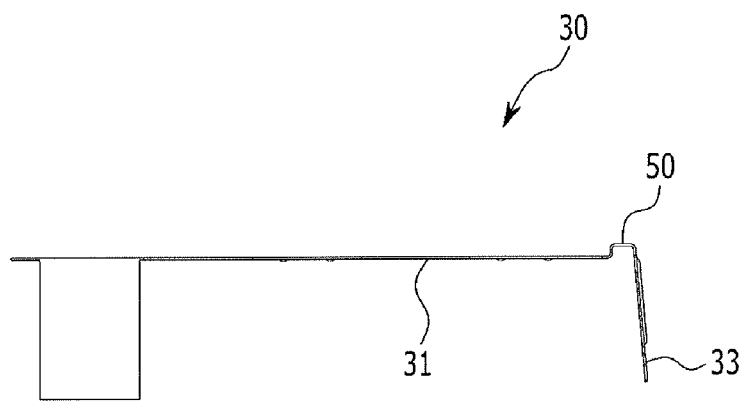
FIG. 8 illustrates a schematic side view of the electrode tab of FIG. 6.

FIG. 6 illustrates a schematic perspective view of the electrode tab connecting the rechargeable batteries, FIG. 7 illustrates a schematic perspective view of an electrode tab connecting three rechargeable tabs, and FIG. 8 illustrates a schematic perspective view of the electrode tab of FIG. 6.

As shown in FIG. 6 to FIG. 8, the electrode tab 30 may include a first tab 31 connecting the rechargeable batteries 10, and a second tab 33 connected to the first tab 31 and bent in a side direction of the rechargeable batteries 10 and then extended. Such an electrode tab 30 may be made of a conductive material such as nickel, aluminum, copper, or silver. This will be described later in detail.

The first tab 31 may be formed in the shape of a plate to connect the plurality of rechargeable batteries 10. The second tab 33 extended with a smaller width than the width of the first tab 31 may be formed in one side of the first tab 31.

The second tab 33 may be electrically connected to the first tab 31, and may be integrally connected to the first tab 31 in the present exemplary embodiment. One end of the second tab 33 may be bent and connected to the first tab 31, and the other end may be extended, e.g., may extend, in the side direction of the rechargeable battery 10.

In such a second tab 33, the balancing wire 40 may be connected to an end extended in the side direction of the rechargeable battery 10.

One end of the balancing wire 40 may be connected to the end of the second tab 33, and the other end thereof may be connected to the protection circuit board 41. As described, the balancing wire 40 may connect the rechargeable battery 10 and the protection circuit board 41 to help protect the rechargeable batteries with the protection circuit board 41 when over-charging occurs.

The protection circuit board 41 may be provided with a circuit that may balance a current and a voltage when the rechargeable batteries 10 are charged and discharged, and damage such as explosion due to, for example, abnormity in charging/discharging of the rechargeable battery 10, may be prevented from occurring.

The balancing wire 40 may be electrically connected to the end of the second tab 33, and the balancing wire 40 may be electrically connected to the second tab 33 by a connector 43. An operator may fix the balancing wire 40 by inserting the balancing wire 40 to the connector 43 while gripping the balancing wire 40 such that the balancing wire 40 may be connected to the second tab 33.

Protruding portion 50 may be formed by being protruded, e.g., by protruding, in a portion where the first tab 31 and the second tab 33 may be connected.

The protruding portion 50 may protrude more, e.g., farther, upward than the first tab 31 in the portion, e.g., region, where the first tab 31 and the second tab 33 may be connected. The protruding portion 50 may protrude to the outside of the surface of the first tab 31 in the portion, e.g., region, where the first tab 31 and the second tab 33 may be connected. The protruding portion 50 may have the same width as the width of the first tab 31 and may be partially bent and then protruded upward of the first tab 31.

As described, the protruding portion 50 may be bent between the first tab 31 and the second tab 33 for a user to stably connect the balancing wire 40 to the connector 43 provided in the end of the second tab 33.

The protruding portion 50 may have elasticity between the first tab 31 and the second tab 33 due to, for example, its bent shape, and insertion pressure generated while the user inserts the balancing wire 40 to the connector 43 may be compensated for by the elastic force of the protruding portion 50.

Accordingly, the electrode tab 30 may be prevented from being moved by being excessively lifted to the outer side of the holder 20 and then moved when the balancing wire 40 is connected to the second tab 33.

Figure 9:
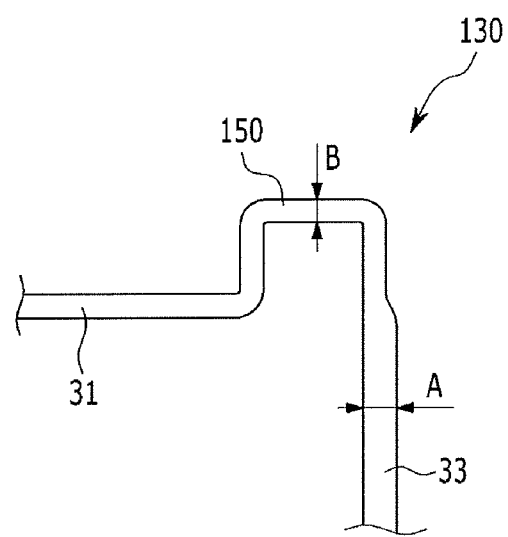
FIG. 9 illustrates a schematic side view of essential parts of an electrode tab according to an exemplary embodiment.

FIG. 9 illustrates a schematic side view of essential parts of an electrode tab according to an exemplary embodiment. Reference numerals in FIG. 1 to FIG. 8 refer to the same or similar members having the same or similar functions, and the description of the same reference numerals will be omitted As shown in FIG. 9, a protruding portion 150 may be formed with a smaller thickness B than a thickness A of a second tab 33 in a portion where a first tab 31 and the second tab 33 may be connected in an electrode tab 130 of a battery module according to the exemplary embodiment illustrated in FIG. 9.

As described, the protruding portion 150 may have a smaller thickness than the thickness of the second tab 33 between the first tab 31 and the second tab 33, a bead may be applied to a portion of the second tab 33 such that the thickness may be greater than the thickness B of the protruding portion 150, and the electrode tab 130 may be prevented from being lifted when connecting the balancing wire 40.

When an abnormal function occurs in the rechargeable battery 10, a fuse function may be effectively performed.

Figure 10:
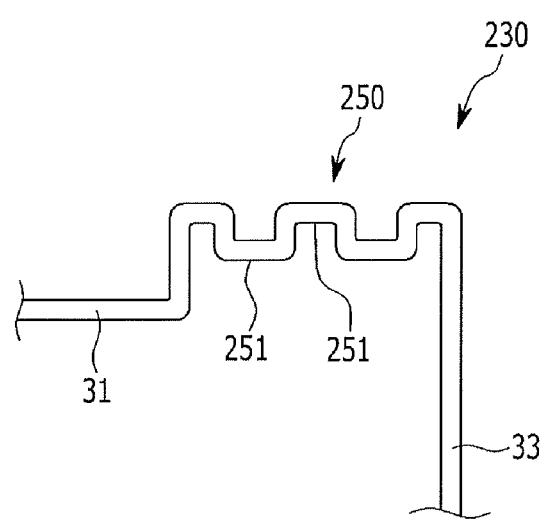
FIG. 10 illustrates a schematic side view of essential parts of an electrode tab according to an exemplary embodiment.

FIG. 10 illustrates a schematic side view of essential parts of an electrode tab according to an exemplary embodiment. Reference numerals in FIG. 1 to FIG. 9 refer to the same or similar members having the same or similar functions, and the description of the same reference numerals will be omitted.

As shown in FIG. 10, protrusion and depression portions 251 may be formed in a protruding portion 250 of an electrode tab 230 of a battery module according to an exemplary embodiment.

A plurality of the protrusion and depression portions 251 may be provided in the protruding portion 250, and a first tab 31 and a second tab 33 may be connected with more improved, e.g., better, elastic force.

When a balancing wire 40 is connected to the second tab 33, a pressure applied to the second tab 33 may be sufficiently compensated for in the protruding portion 250, and the electrode tab 230 may be stably installed rather than being moved in an upper direction of a holder 20 when connecting the balancing wire 40.

Figure 11:
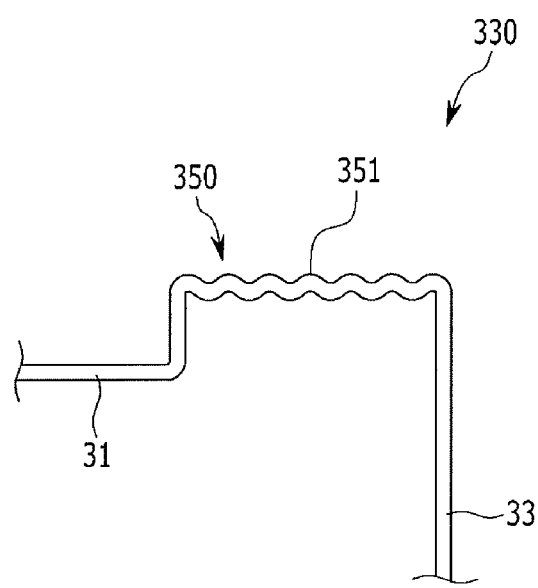
FIG. 11 illustrates a schematic side view of essential parts of an electrode tab according to an exemplary embodiment.

FIG. 11 illustrates a schematic side view of essential parts of an electrode tab according to an exemplary embodiment. Reference numerals in FIG. 1 to FIG. 10 refer to the same or similar members having the same or similar functions, and the description of the same reference numerals will be omitted.

As shown in FIG. 11, a wrinkled portion 351 may be formed in a protruding portion 350 of an electrode tab 330 of a battery module according to an exemplary embodiment.

The wrinkled portion 351 may be formed in a length direction of the protruding portion 50, and a first tab 31 and a second tab 33 may be connected with more improved, e.g., better, elastic force.

When a balancing wire 40 is connected to the second tab 33, a pressure applied to the second tab 33 may be sufficiently compensated for in the protruding portion 50, and the electrode tab 30 may be stably installed rather than being moved in an upper direction of a holder 20 when connecting the balancing wire 40.

Figure 12:
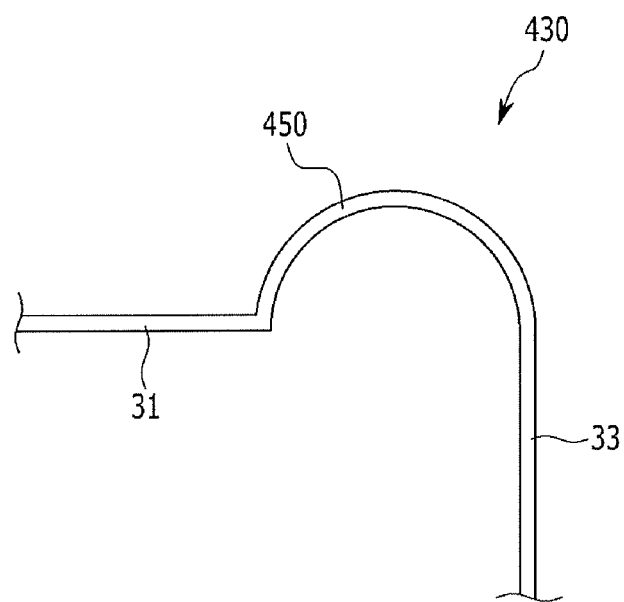
FIG. 12 illustrates a schematic side view of essential parts of an electrode tab according to an exemplary embodiment.

FIG. 12 illustrates a schematic side view of essential parts of an electrode tab according to an exemplary embodiment. Reference numerals in FIG. 1 to FIG. 11 refer to the same or similar members having the same or similar functions, and the description of the same reference numerals will be omitted.

As shown in FIG. 12, a protruding portion 450 of an electrode tab 430 of a battery module 100 according to an exemplary embodiment may be formed to be connected in a rounded shape between a first tab 31 and a second tab 33.

As described, when the protruding portion 450 is protruded, e.g., protrudes, with the rounded shape between the first tab 31 and the second tab 33, more effective elastic force may be provided when connecting the first tab 31 and the second tab 33.

By way of summation and review, a high power rechargeable battery may include a non-aqueous electrolyte having high energy density, and may be constituted by, e.g., include, a large capacity battery module in which a plurality of rechargeable batteries may be coupled in series in order to use it to drive devices requiring a large amount of power, for example, motors such as for electric vehicles.

Such a battery module may include an electrode tab connecting rechargeable batteries and a balancing wire connecting the electrode tab to a protection circuit substrate. The balancing wire may be connected to the protection circuit substrate while being fixed to the electrode tab through an end portion thereof.

However, when the balancing wire is being connected to the electrode tab, the electrode tab may be moved in an upper direction of the battery module due to, for example, a pressure when connecting the balancing wire, and a problem in stable connection may be caused.

Embodiments relate to a battery module in which an electrode tab may be stably connected. Provided is a battery module in which an electrode tab and a balancing wire may be stably connected.

According to an exemplary embodiment, a protruding portion having elastic force may be connected between the first tab and the second tab so that an insertion pressure generated when a user connects the balancing wire to the electrode tab may be compensated for by the elastic force of the protruding portion, and the electrode tab may be prevented from being moved by being excessively lifted to the outer side of the holder when the balancing wire is connected to the electrode tab.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of rechargeable batteries;
a holder fixing the rechargeable batteries;
an electrode tab connecting the rechargeable batteries, the electrode tab including a first tab connecting the rechargeable batteries and a second tab connected to the first tab, the second tab extending in a side direction of the rechargeable batteries, and a bending portion between the first tab and the second tab; and
a balancing wire connecting the electrode tab and a protection circuit board,
the bending portion of the electrode tab including a protruding portion protruding from a surface of the electrode tab in a protruding direction, wherein
the protruding portion has a thickness in the protruding direction of the protruding portion that is smaller than a thickness of the second tab in a direction perpendicular to the side direction of the rechargeable batteries.

2. The battery module as claimed in claim 1, wherein the protruding portion protrudes from a surface of the electrode tab in a region where the first tab and the second tab are connected.

3. The battery module as claimed in claim 2, wherein:
one side of the protruding portion is connected to the first tab and another side of the protruding portion is connected to the second tab, and
the protruding portion is bent multiple times.

4. The battery module as claimed in claim 2, wherein the protruding portion includes a plurality of protrusion and depression portions in a connection portion between the first tab and the second tab.

5. The battery module as claimed in claim 2, wherein the protruding portion includes a wrinkled portion.

6. The battery module as claimed in claim 2, wherein the protruding portion connects the first tab and the second tab with a rounded shape.

7. The battery module as claimed in claim 1, wherein the second tab is connected to the balancing wire by a connector.

* * * * *